US010536019B2

(12) United States Patent
Zaghib et al.

(10) Patent No.: US 10,536,019 B2
(45) Date of Patent: Jan. 14, 2020

(54) METHOD FOR THE ELECTROCHEMICAL CHARGING/DISCHARGING OF A LITHIUM-SULPHUR (LI—S) BATTERY AND DEVICE USING THE METHOD

(71) Applicant: HYDRO-QUÉBEC, Montréal, Québec (CA)

(72) Inventors: Karim Zaghib, Longueuil (CA); Chisu Kim, Longueuil (CA); Abdelbast Guerfi, Brossard (CA); Myunghun Cho, St-Lambert (CA)

(73) Assignee: HYDRO-QUÉBEC, Montréal, Québec (CA)

( * ) Notice: Subject to any disclaimer, the term of this patent is extended or adjusted under 35 U.S.C. 154(b) by 202 days.

(21) Appl. No.: 15/304,265

(22) PCT Filed: Apr. 14, 2015

(86) PCT No.: PCT/CA2015/050306
§ 371 (c)(1),
(2) Date: Oct. 14, 2016

(87) PCT Pub. No.: WO2015/157859
PCT Pub. Date: Oct. 22, 2015

(65) Prior Publication Data
US 2017/0040806 A1 Feb. 9, 2017

Related U.S. Application Data

(60) Provisional application No. 61/979,823, filed on Apr. 15, 2014.

(51) Int. Cl.
H01M 10/44 (2006.01)
H01M 10/46 (2006.01)
H02J 7/00 (2006.01)
H01M 4/04 (2006.01)
H01M 4/136 (2010.01)
H01M 10/0525 (2010.01)
H01M 4/58 (2010.01)
H01M 10/052 (2010.01)

(52) U.S. Cl.
CPC .......... H02J 7/007 (2013.01); H01M 4/0447 (2013.01); H01M 4/136 (2013.01); H01M 4/5815 (2013.01); H01M 10/0525 (2013.01); H01M 10/44 (2013.01); H01M 10/441 (2013.01); H01M 10/446 (2013.01); H01M 10/052 (2013.01)

(58) Field of Classification Search
CPC .......... H02J 7/245; H02J 7/042; H02J 7/0093
USPC ....... 320/107, 127, 128, 129, 132, 135, 139, 320/141; 324/432, 433; 340/636.12, 340/636.13, 636.15, 636.2
See application file for complete search history.

(56) References Cited

U.S. PATENT DOCUMENTS

| | | | |
|---|---|---|---|
| 5,291,116 A | 3/1994 | Feldstein | |
| 6,307,353 B1 | 10/2001 | Shiojima | |
| 6,329,789 B1 | 12/2001 | Gavrilov et al. | |
| 6,376,123 B1 | 4/2002 | Chu | |
| 7,019,494 B2 | 3/2006 | Mikhaylik | |
| 7,646,171 B2 | 1/2010 | Mikhaylik | |
| 7,777,452 B2* | 8/2010 | Nishiyama | H01M 10/0525 320/129 |
| 8,647,769 B2 | 2/2014 | Kolosnitsyn et al. | |
| 2005/0099162 A1* | 5/2005 | Ding | H02J 7/0093 320/141 |
| 2005/0156575 A1 | 7/2005 | Mikhaylik | |
| 2005/0266299 A1 | 12/2005 | Nishiyama et al. | |
| 2006/0208701 A1 | 9/2006 | Mikhaylik | |
| 2006/0238203 A1 | 10/2006 | Kelly et al. | |
| 2008/0233467 A1 | 9/2008 | Issaev et al. | |
| 2010/0134305 A1* | 6/2010 | Lu | H02J 7/0021 340/636.13 |
| 2012/0032648 A1* | 2/2012 | Ghantous | G01R 31/3637 320/139 |
| 2013/0193904 A1 | 8/2013 | Rugolo | |
| 2013/0341205 A1 | 12/2013 | Baba et al. | |
| 2014/0084846 A1 | 3/2014 | Berkowitz et al. | |
| 2016/0204625 A1* | 7/2016 | Josephs | H02J 7/007 320/139 |

FOREIGN PATENT DOCUMENTS

| | | |
|---|---|---|
| CN | 1435002 A | 8/2003 |
| CN | 101163980 A | 4/2008 |
| CN | 101636864 A | 1/2010 |
| CN | 102354773 A | 2/2012 |
| EP | 1248309 A1 | 10/2002 |
| EP | 2127003 | 12/2009 |
| JP | H08503837 A | 4/1996 |
| JP | 2004171864 A | 6/2004 |

(Continued)

OTHER PUBLICATIONS

Jayaprakash N. et al.,"Porous Hollow Carbon@Sulfur Composites for High-Power Lithium-Sulfur Batteries" Angew. Chem., vol. 123, 2011, pp. 6026-6030.

Ji L. et al.,"Graphene Oxide as a Sulfur Immobilizer in High Performance Lithium/Sulfur Cells" American Chemical Society, vol. 133, 2011, pp. 18522-18525.

Ji X. et al.,"Advances in Li—S batteries" J. Mater. Chem., vol. 20, 2010, pp. 9821-9826.

Yu-Sheng Su et al.,"A strategic approach to recharging lithium-sulphur batteries for long cycle life" Nature Communications, DOI: 10.1038/ncomms3985, 2013 Macmillan Publishers Limited, pp. 1-8.

(Continued)

Primary Examiner — Edward Tso
(74) Attorney, Agent, or Firm — Buchanan Ingersoll & Rooney P.C.

(57) ABSTRACT

A process of charging or discharging a Li—S battery or cell is provided. A device for carrying out the process of charging or discharging the Li—S battery or cell is also provided. A process for manufacturing the Li—S battery is provided.

17 Claims, 6 Drawing Sheets

(56) References Cited

FOREIGN PATENT DOCUMENTS

| | | |
|---|---|---|
| JP | 2010040198 A | 2/2010 |
| JP | 2012138299 A | 7/2012 |
| WO | 2008/114219 A1 | 9/2008 |

OTHER PUBLICATIONS

Zheng G. et al.,"Amphiphilic Surface Modification of Hollow Carbon Nanofibers for Improved Cycle Life of Lithium Sulfur Batteries" American Chemical Society, Nano Lett., vol. 13, 2013, pp. 1265-1270.

Zheng J. et al.,"Controlled Nucleation and Growth Process of Li2S2/Li2S in Lithium-Sulfur Batteries" Journal of the Electrochemical Society, vol. 160, No. 11, 2013, pp. AI992-AI996.

Cui X. et al.,"Rechargeable Batteries with High Energy Storage Activated by In-situ Induced Fluorination of Carbon Nanotube Cathode" Scientific Reports, 4: 5310 J DOI: 10.1038/srep05310, 2014, pp. 1-7.

Yao H. et al.,"Improving lithium-sulphur batteries through spatial control of sulphur species deposition on a hybrid electrode surface" 2014 Macmillan Publishers Limited, Natures Communications, pp. 1-9.

Extended European Search Report dated Oct. 19, 2017, issued by the European Patent Office in corresponding European Application No. EP 15779476.9 (8 pages).

International Search Report (Form PCT/ISA/220) and the Written Opinion (Form PCT/ISA/237) dated Jul. 21, 2015, in corresponding International Application No. PCT/CA2015/050306. (10 pages).

Office Action (Communication 94(3) CBE) dated Oct. 17, 2018, by the European Patent Office in corresponding European Application No. 15 779 476.9-1108, 7 pages.

Office Action (Notification of the First Office Action) dated Jun. 28, 2018, by the State Intellectual Property Office of the People's Republic of China in corresponding Chinese Patent Application No. 20150019834.X, and an English Translation of the Office Action. (19 pages).

Office Action (Notice of Reasons for Refusal) dated Dec. 28, 2018, by the Japanese Patent Office in corresponding Japanese Patent Application No. 2016-561306, and an English Translation of the Office Action. (10 pages).

Office Action (Notice of Reasons for Refusal) dated Jun. 25, 2019, by the Japanese Patent Office in corresponding Japanese Patent Application No. 2016-561306, and an English Translation of the Office Action. (6 pages).

Office Action (The Third Office Action) dated Oct. 8, 2019, by the State Intellectual Property Office of the People's Republic of China in corresponding Chinese Patent Application No. 201580019834, and an English translation of the Office Action. (15 pages).

* cited by examiner

METHOD FOR THE ELECTROCHEMICAL CHARGING/DISCHARGING OF A LITHIUM-SULPHUR (LI—S) BATTERY AND DEVICE USING THE METHOD

FIELD OF THE INVENTION

The present invention relates generally to electrochemical cells and batteries wherein the cathode comprises a sulfur-based material and the anode comprises a lithium-based material (Li—S). More specifically, the invention relates to a charge/discharge process of a Li—S battery and a device for carrying out the process. Moreover, the invention relates to a process for manufacturing a Li—S battery, which embodies the charge/discharge process according to the invention.

BACKGROUND OF THE INVENTION

High energy density batteries such as Li—S batteries are more and more in demand as the use of portable electronic devices increases. Chemical reactions in Li—S batteries are based on conversion reactions occurring with the phase changes between solid phases and soluble intermediates; whereas in conventional batteries the chemical reactions are based on intercalation reactions occurring within well-defined solid media. Cathodes in Li—S batteries thus undergo important morphological and volumetric changes. This constitutes one of the fundamental challenges when it is desired to manufacture a Li—S battery with a long life cycle. A simplified reaction scheme in a Li—S battery is as follows:

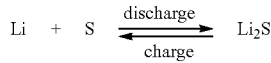

The chemical reactions at each step are as follows:

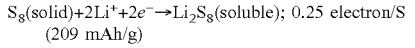 (I)

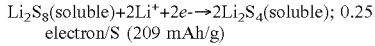 (II)

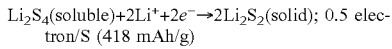 (III)

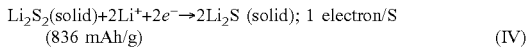 (IV)

The solid products in the chemical reactions outlined above present a high resistivity in both electron conductivity and lithium-ion conductivity. Accordingly, control of the morphology of these solid products is an important factor in the determination of the reversibility of a Li—S battery (Jianming Zheng et al., "Controlled Nucleation and Growth Process of $Li_2S_2/Li_2S$ in Lithium-Sulfur Batteries", *Journal of Electrochemical Society* 2013, 160(11), A1992-A1996). Various control strategies are known in the art.

One strategy developed for the morphological control of the solid products in a Li—S battery consists of confining the active sulfur inside a conductive matrix (generally a carbon-based material). Such conductive matrix may be for example mesoporous carbon (X. Ji, L. F. Nazar, J. Mat. Chem. 20 (2010) 9821-9826), carbon in hollow sphere form (N. Jayaprakash, J. Shen, S. S. Moganty, A. Corona, L. A. Archer, Angew. Chem. 123 (2011) 6026-6030), carbon nanotubes (CNTs) (G. Zheng, Q. Zhang, J. J. Cha, Y. Yang, W. Li, Z. W. Seh, Y. Cui, Nano Lett. (2013) 13, 1265-1270) or graphene layers (L. Ji, M. Rao, H. Zheng, L. Zhang, Y. Li, W. Duan, J. Guo, E. J. Cairns, Y. Zhang, J. Am. Chem. Soc. 133 (2011) 18522-18525).

The above various approaches based on confinement of sulfur inside a conductive matrix have yielded interesting results, which confirms that high energy batteries Li—S are promising. However, there are still many drawbacks associated to these batteries. Firstly, sulfur confinement is not always perfect or permanent. After a certain number of cycles, soluble sulfurs diffuse outside the matrix and into the electrolyte. Secondly, the volumetric energy density of the cell is not better than that of a conventional Li-ion battery, due to the very low density of the composite carbon. Thirdly, the confinement process is not economically viable on a large scale, which renders commercialization difficult.

Other strategies for the morphological control of the solid products in a Li—S battery are based on the nature of the electrolyte used in the cell. Such approaches are disclosed for example in U.S. Pat. Nos. 7,019,494, 7,646,171, U.S. 2006-0208701 and U.S. 2005-0156575.

Moreover, other strategies have been attempted based on the charge and/or discharge of the Li—S battery. Such processes are disclosed for example in Yu-Sheng Su et al., "A Strategic Approach to Recharging Lithium-Sulphur Batteries for Long Cycle Life", *Nature Communications*, published Dec. 18, 2013; U.S. Pat. No. 8,647,769.

There is still a need to develop strategies for improving the performance and characteristics of Li—S batteries.

The present description refers to a number of documents, the content of which is herein incorporated by reference in their entirety.

SUMMARY OF THE INVENTION

The inventors have developed a charge/discharge process which allows for the morphological control of the active material in a Li—S battery; the capacity and life cycle of the battery are thus improved. The process according to the invention is used as a tool in the control process.

More specifically, the inventors have discovered that during the charge/discharge process, variations in the profile of the current used allow for an improvement of the capacity and life cycle of the battery.

The process according to the invention may be carried out using a Li—S battery charge/discharge device. The present invention relates to such device.

Moreover, the process according to the invention may be embodied in a manufacturing process for a Li—S battery, in particular at the stage of formation and/or aging of the battery. The present invention relates to such manufacturing process.

The invention thus provides the following according to an aspect thereof:

(1) Process for charge/discharge of a Li—S battery or cell, comprising use of a pulsed current.

(2) Process for charge/discharge of a Li—S battery or cell, comprising use of a pulsed current at the charge step, at the discharge step, or at both the charge and discharge steps.

(3) Process for charge/discharge of a Li—S battery or cell, comprising use of a pulsed current at the charge step only.

(4) Process for charge/discharge of a Li—S battery or cell, comprising use of a pulsed current at the discharge step only.

(5) Process for charge/discharge of a Li—S battery or cell, comprising use, in combination, of a pulsed current and a constant current.
(6) Process for charge/discharge of a Li—S battery or cell, comprising use, in combination, of a pulsed current and a constant current at the charge step, at the discharge step, or at both the charge and discharge steps.
(7) Process for charge/discharge of a Li—S battery or cell, comprising use, in combination, of a pulsed current and a constant current at the charge step only.
(8) Process for charge/discharge of a Li—S battery or cell, comprising use, in combination, of a pulsed current and a constant current at the discharge step only.
(9) Device for charge/discharge of a Li—S battery or cell, the device being adapted for providing a pulsed current.
(10) Device for charge/discharge of a Li—S battery or cell, the device being adapted for providing a pulsed current, a constant current or a combination of a pulsed current and a constant current.
(11) Device for charge/discharge of a Li—S battery or cell, the device being adapted for providing a pulsed current and a constant current, intermittently.
(12) Process for the manufacture of a Li—S battery, comprising a step of formation and/or aging of the battery, the step using a pulsed current.
(13) Process for the manufacture of a Li—S battery, comprising a step of formation and/or aging of the battery, the step using a combination of a pulsed current and a constant current.
(14) Process according to any one of items (1)-(8), or device according to item (10) or (11), or process according to item (12) or (13), wherein the pulsed current is obtained by applying a constant current during a first period of time followed by an inversion of the current direction during a second period of time.
(15) Process according to any one of items (1)-(8), or device according to item (10) or (11), or process according to item (12) or (13), wherein the pulsed current is obtained by applying a constant current during a first period of time followed by a pause during a period of time.
(16) Process according to any one of items (1)-(8), or device according to item (10) or (11), or process according to item (12) or (13), wherein the pulsed current is obtained by applying a constant current during a first period of time lasting between about 0.1 second to about 10 hours followed by an inversion of the current direction during a second period of time lasting between about 0.1 to about 10 hours.
(17) Process according to any one of items (1)-(8), or device according to item (10) or (11), or process according to item (12) or (13), wherein the pulsed current is obtained by applying a constant current during a first period of time lasting between about 0.1 second to about 10 hours followed by a pause during a period of time lasting between about 0.1 to about 10 hours.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

Figure 1:
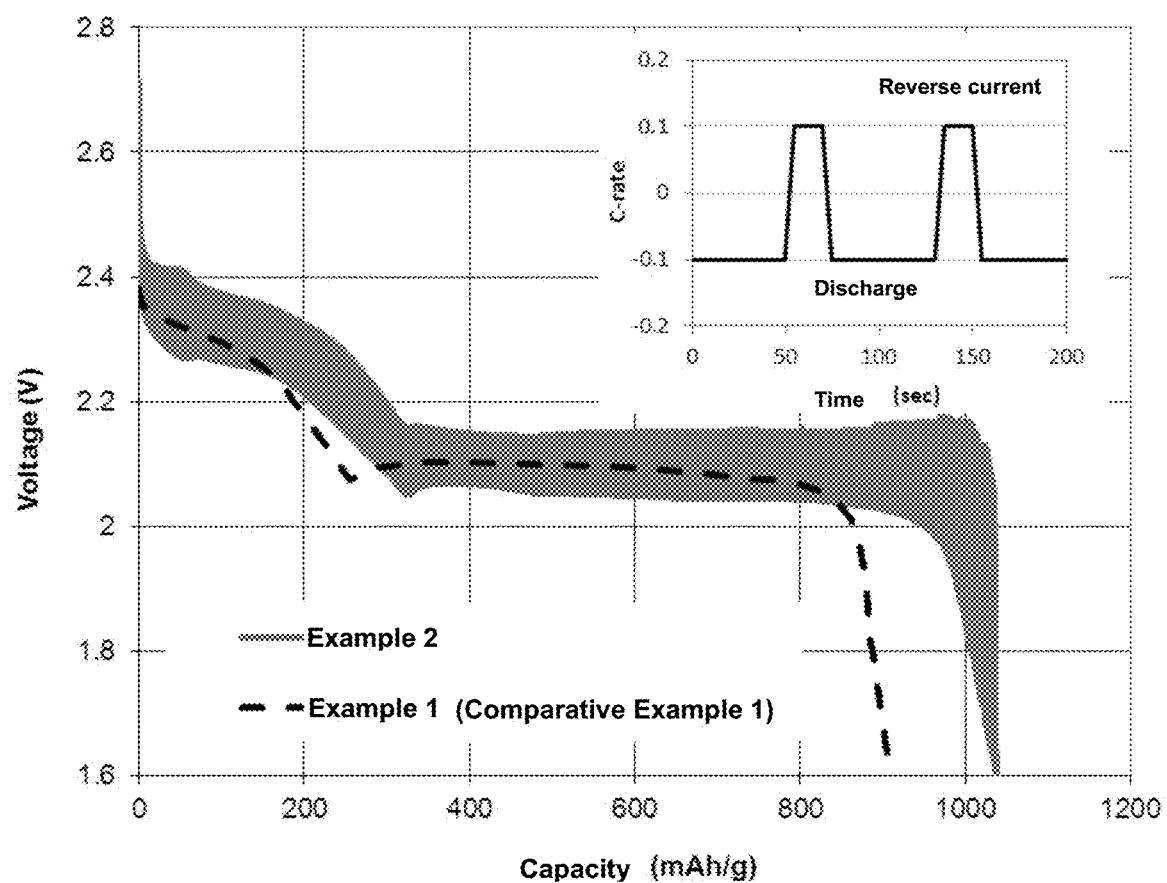
FIG. 1 illustrates the discharge of a battery of Example 2 versus a battery of Comparative Example 1.

As used herein, the term "pulsed current" refers to an application of current for a limited period of time, followed by an inversion of the current direction for a limited period of time or a pause for a limited period of time.

As used herein, the term "constant current" refers to an application of current which is controlled by a limited voltage or an accumulation of energy, with no limit on the overlapping time.

As used herein, the term "hybrid current" refers to the use of a combination of pulsed current and constant current during the same charge or discharge step As used herein, the term "charge" refers to electrochemical reactions during which the positive electrode is oxidized and the negative electrode is reduced, generating a flux of current from the positive electrode to the negative electrode (positive current).

As used herein, the term "discharge" refers to electrochemical reactions during which the positive electrode is reduced and the negative electrode is oxidized, generating a flux of current from the negative to the positive electrode (negative current).

As used herein, the term "charge/discharge" refers to the charge and/or discharge of a battery.

As used herein, the term "charging device" refers to an electronic device which generates a current for the charge of a battery.

The inventors have developed a charge/discharge process which allows for the morphological control of the active material in a Li—S battery. The process according to the invention allows for the amelioration of the capacity and life cycle of the battery. The process is used as a tool for the morphological control of the active material in a Li—S battery. More specifically, have discovered that during the charge/discharge process, variations in the profile of the current used allow for an improvement of the capacity and life cycle of the battery.

Indeed, given that the current represents the speed of reaction (oxidation or reduction) in the electrochemical cells, the kinetic of the reactions may be controlled directly by programing the profile of the current.

In conventional rechargeable lithium batteries, a current is generally applied to charge the battery, in such a way that the reactions occur at a constant rate. The present invention provides a process which uses a pulsed current. The process facilitates the use of active sulfur in a Li—S battery. The pulsed current provides relaxation and re-balancing gradually as the reactions in the Li—S battery occur, and the morphology of the solid products formed ($S_8$, $Li_2S_2$, $Li_2S$) is less resistive. Indeed, the relaxation or re-balancing allows for an increase of the time of interaction between the solid products and the soluble species in the electrolyte.

The invention presents another advantage in that the charging time may be reduced by combining various amplitudes of pulsation depending on the regions of the state of charging (SOC). Generally, it is necessary to limit the charging speed in order to prevent unwanted irreversible reactions which occur under high current conditions. The application of a pulsed current leads to a more tolerable limit of the charging current.

In an embodiment of the invention, the process may be applied to any type of battery which uses a sulfur-based cathode material. In another embodiment, sulfur may be elemental sulfur, an organo-sulfur, carbon-sulfur compositions or any other similar composition.

In an embodiment of the invention, the process may also be applied to cells with high load cathodes (>1 mg_sulfur/$cm^2$) and/or a viscous electrolyte (>10 mPa·S).

The process according to the invention may be carried out in a charging device used for the charge/discharge of a Li—S battery. The inventions relates to such devices.

Moreover, the process according to the invention may be embodied in a manufacturing process for a Li—S battery. In particular, the process according to the invention may be embodied in the formation and/or aging step.

EXAMPLES

The present invention is illustrated further by the examples below. The invention is not limited by these examples.

Example 1

Comparative Example 1 a) Preparation of a Positive Electrode Film

Polyethylene oxide homo polymer (PEO) (MM: 5.000.000) is dissolved in a mixture of acetonitrile and toluene (volumic ratio: 8:2), at a 10% molecular weight concentration. Sulfur powder (3 g), Ketjen black (1 g), the PEO solution (4.49 g) are mixed together using a planetary centrifugal mixer (Thinky Mixer ARE-250) to obtain a suspension. Additional solvent is added to the mixture (acetonitrile+toluene, volumic ratio: 8:2) such as to reach a viscosity suitable for the coating, about 10000 cP. The suspension so obtained is used to form a coating on an aluminum foil covered with carbon. Formation of the coating is performed using a "doctor blade" with a 200 μm gap. The load of sulfur is about 2 mg/$cm^2$ following evaporation of the solvent.

b) Cell Assembly

CR2032 cells having the size of a coin are assembled inside a glove box filled with helium gas using a separator Celgard 3501 and a lithium foil (Hoshen, 200 μm) as anode. Then, 0.12 mL of a lithium bis-(trifluoromethylsulfonyl) imide (LiTFSI) solution in a mixture of dimethoxy ethane (DME) and 1,3-dioxolane (DOX) (volumic ratio: 1:1) is injected into the cell, forming a liquid electrolyte.

c) Formation

The cell so constituted is kept at 25° C. for 12 hours then submitted to the charge/discharge process using a constant current of 0.1C, 3 times, between 1.6V and 2.8V at 25° C. The capacity of discharge of the battery of Comparative Example 1 is illustrated in FIGS. 1-5. The capacity obtained for Comparative Example 1 is 909 mAh.

Example 2

A pulsed current, instead of a continuous current, is applied at the stage of formation (during the charge steps and the discharge steps). The pulsed current is characterized in that: the 0.1C current is applied for 60 seconds followed by an inversion of the direction of the current for 20 seconds. This is illustrated in FIG. 1. Application of this pulsed current is repeated until the cutoff voltages are reached. The other experimental conditions are the same as in Example 1. The battery discharge capacity in Example 2 is illustrated in FIG. 1 in comparison with Comparative Example 1. In Example 2, a capacity of 1034 mAh is reached. This is 14% higher than the capacity obtained in Comparative Example 1.

Example 3

Figure 2:
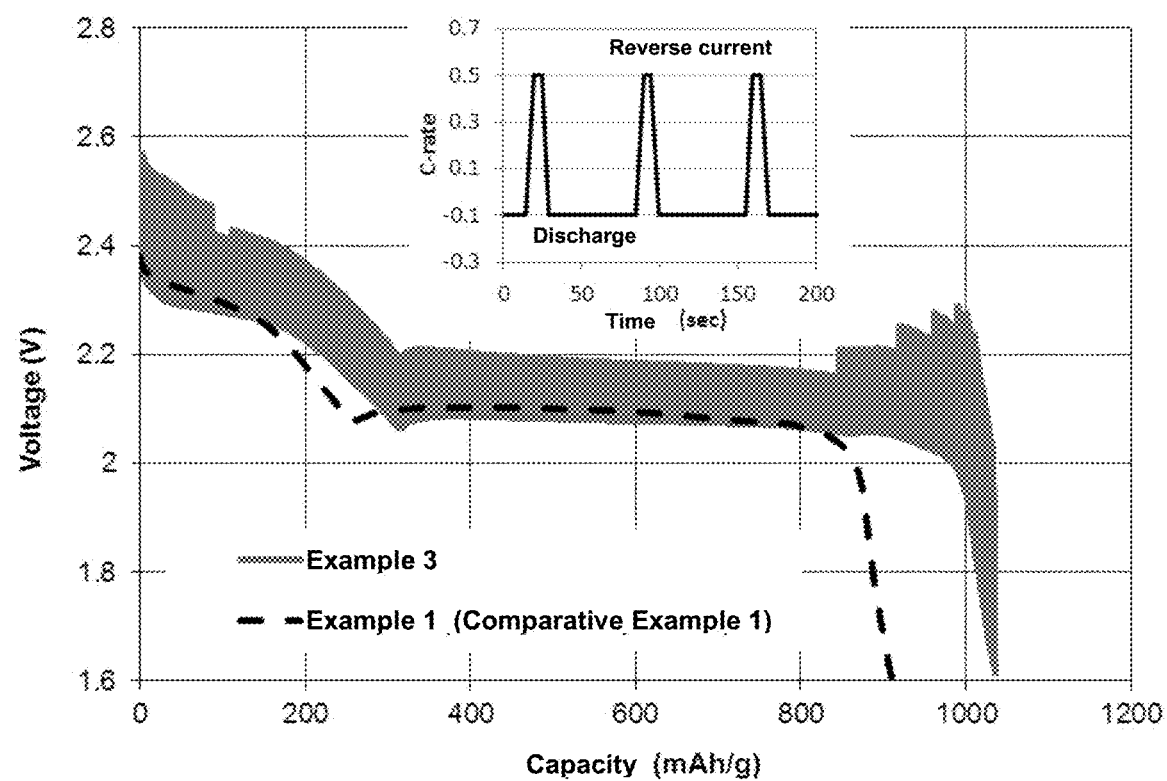
FIG. 2 illustrates the discharge of a battery of Example 3 versus a battery of Comparative Example 1.

A pulsed current, instead of a continuous current, is applied at the stage of formation (during the charge steps and the discharge steps). The pulsed current is characterized in that: the 0.1C current is applied for 60 seconds followed by the 0.5C current in the opposite direction for 4 seconds. This is illustrated in FIG. 1. Application of this pulsed current is repeated until the cutoff voltages are reached. The other experimental conditions are the same as in Example 1. The battery discharge capacity in Example 3 is illustrated in FIG. 2 in comparison with Comparative Example 1. In Example 3, a capacity of 1036 mAh is reached. This is 14% higher than the capacity obtained in Comparative Example 1.

Example 4

Figure 3:
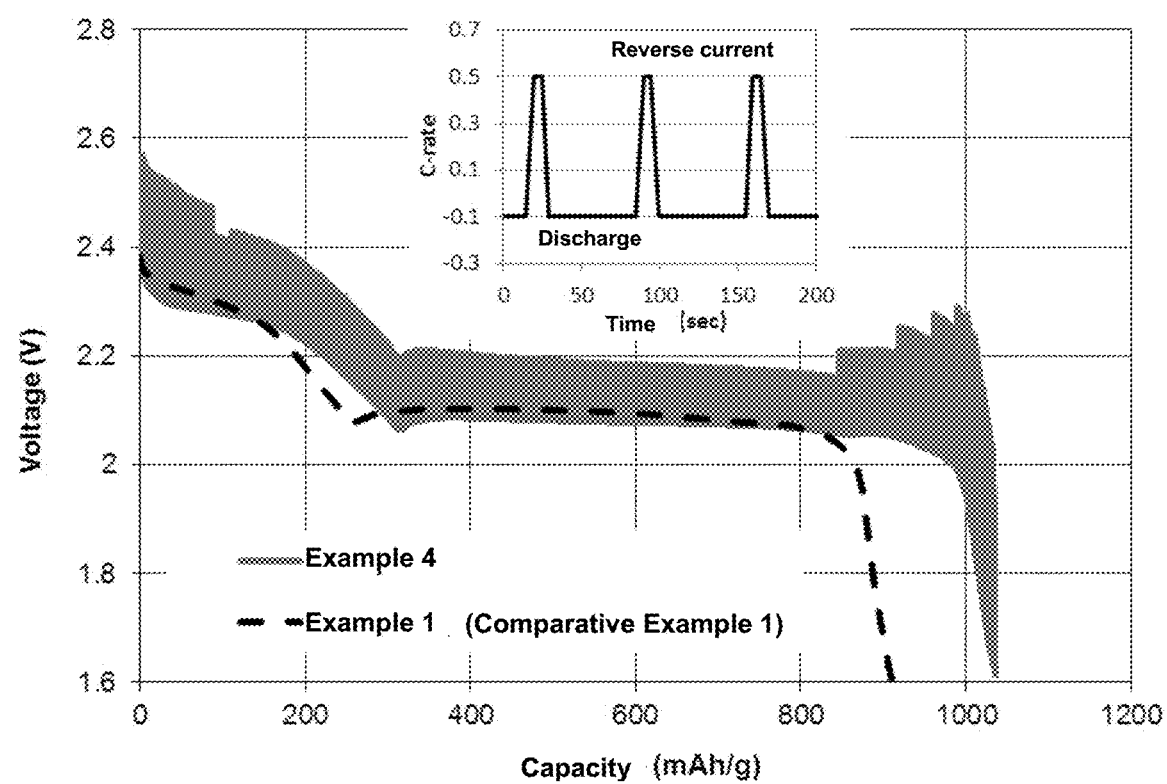
FIG. 3 illustrates the discharge of a battery of Example 4 versus a battery of Comparative Example 1.

A pulsed current is applied, which is characterized in that: the 0.1C current is applied for 60 seconds followed by the 0.5C current in opposite direction for 4 seconds, only during the discharge steps; and a constant current is applied during the charge steps. The other experimental conditions are the same as in Example 1. The battery discharge capacity in Example 4 is illustrated in FIG. 3 in comparison with Comparative Example 1. In Example 3, a capacity of 1048 mAh is reached. This is 15% higher than the capacity obtained in Comparative Example 1.

Example 5

Figure 4:
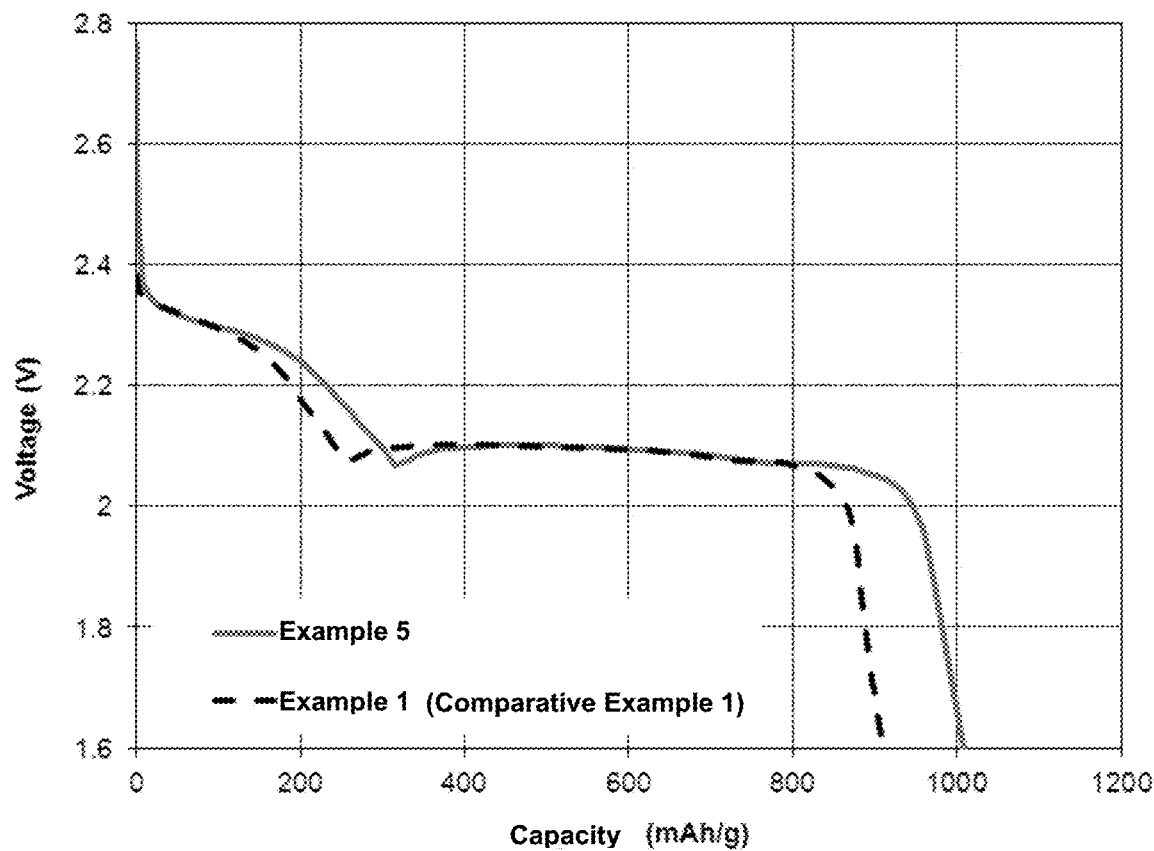
FIG. 4 illustrates the discharge of a battery of Example 5 versus a battery of Comparative Example 1.

A pulsed current is applied, which is characterized in that: the 0.1C current is applied for 60 seconds followed by the 0.1C current in opposite direction for 20 seconds, only during the charge steps; and a constant current is applied during the discharge steps. The other experimental conditions are the same as in Example 1. The battery discharge capacity in Example 5 is illustrated in FIG. 4 in comparison with Comparative Example 1. In Example 5, a capacity of 1008 mAh is reached. This is 11% higher than the capacity obtained in Comparative Example 1.

Example 6

Figure 5:
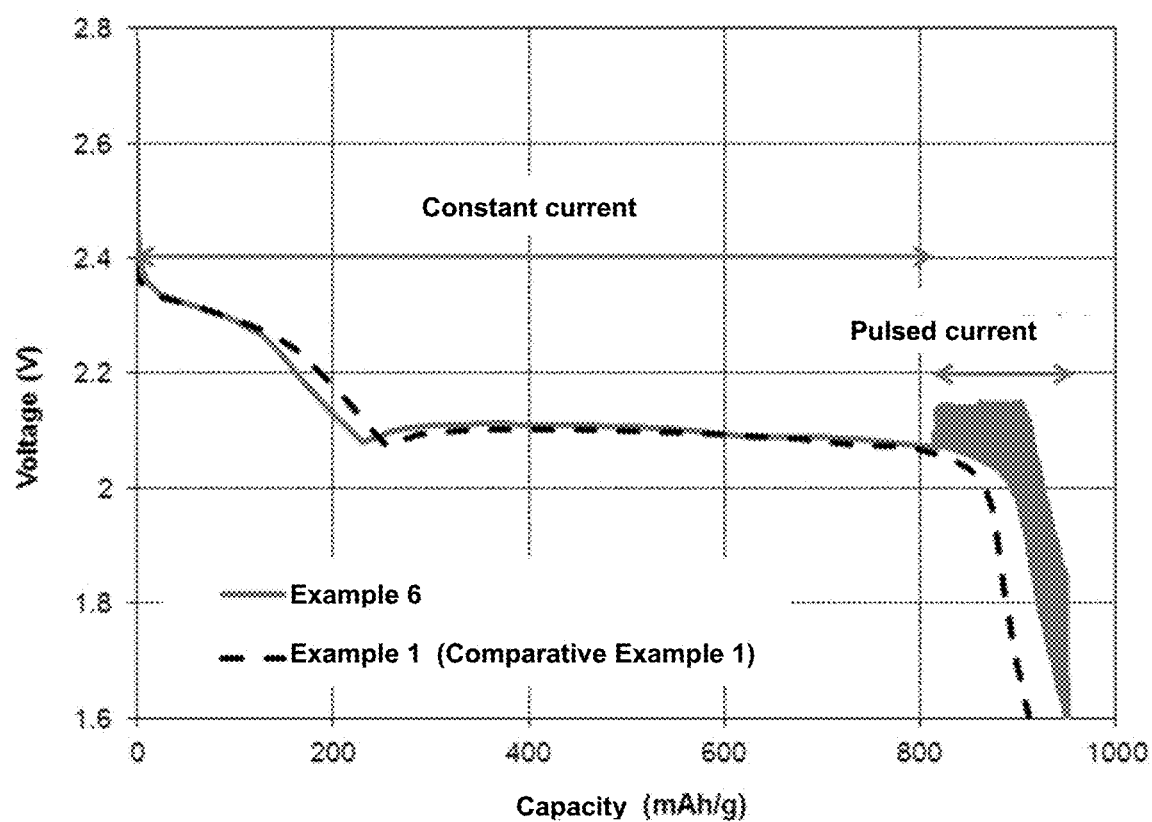
FIG. 5 illustrates the discharge of a battery of Example 6 versus a battery of Comparative Example 1.

A pulsed current is applied during only 30% of the discharge steps. It is to be understood that in this example, a combination of pulsed current and constant current is applied, i.e., a "hybrid current". The other experimental conditions are the same as in Example 4. The battery discharge capacity in Example 6 is illustrated in FIG. 5 in comparison with Comparative Example 1. In Example 6, a capacity of 951 mAh is reached. This is 5% higher than the capacity obtained in Comparative Example 1.

Example 7

Comparative Example 2

Figure 6A:
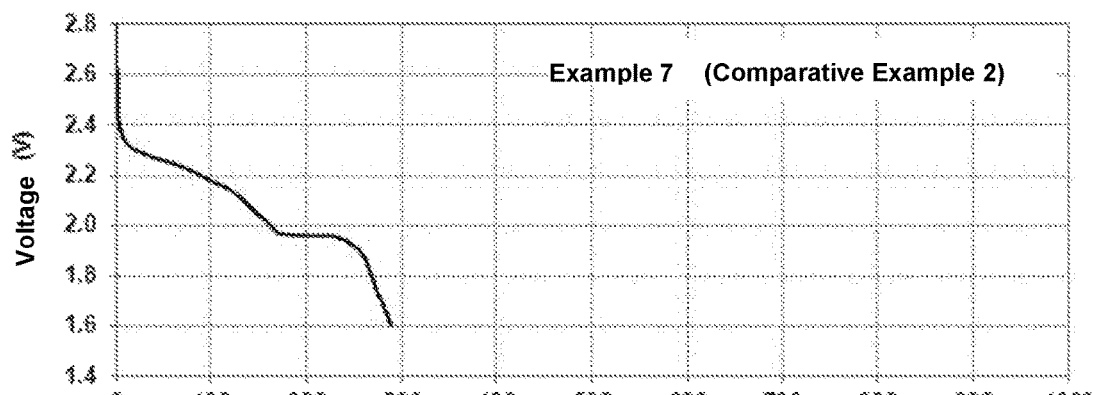
FIG. 6a illustrates the discharge of a battery of Example 7 (Comparative Example 2).

Lithium bis-(trifluoromethylsulfonyl)imide (LiTFSI) 0.5M in a mixture of N-propyl-N-methylpyrrolidinium bis (trifluoromethanesulfonyl)imide (PY13TFSI), DME and DOX (volumic ratio: 2:1:1) is injected in a cell, forming a liquid electrolyte. The other experimental conditions are the same as in Example 1. The battery discharge capacity in Example 7 (Comparative Example 2) is illustrated in FIG. 6a. The capacity obtained in Comparative Example 2 is 288 mAh.

Example 8

Figure 6B:
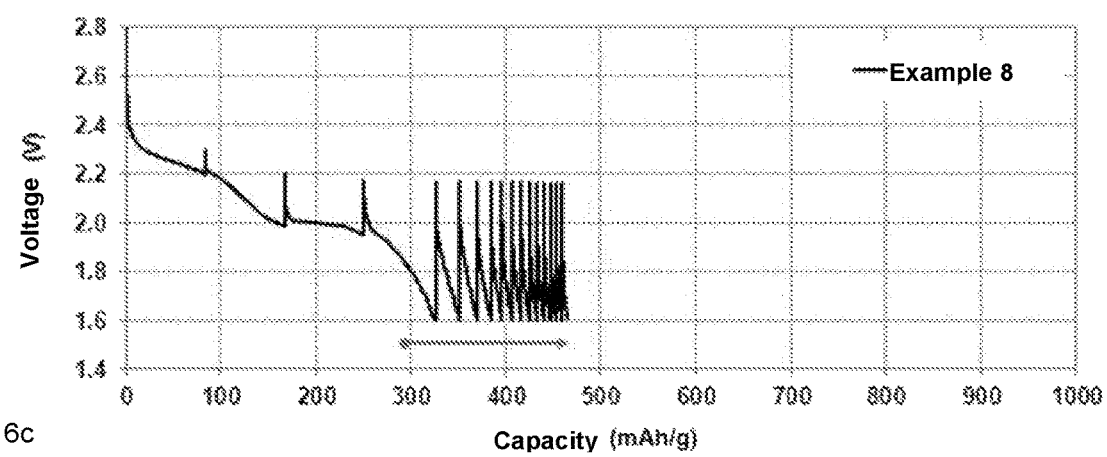
FIG. 6b illustrates the discharge of a battery of Example 8 versus a battery of Comparative Example 2.

A pulsed current, instead of a continuous current, is applied at the stage of formation. The pulsed current is characterized in that: the 0.1C current is applied for 1 hour followed by a 2 hours pause. Application of this pulsed current followed by the pause is repeated until the cutoff voltages are reached. The other experimental conditions are the same as in Example 7. The battery discharge capacity in Example 8 is illustrated in FIG. 6b in comparison with Example 7 (Comparative Example 2). In Example 8, a capacity of 458 mAh is reached. This is 59% higher than the capacity obtained in Comparative Example 2.

Example 9

Figure 6C:
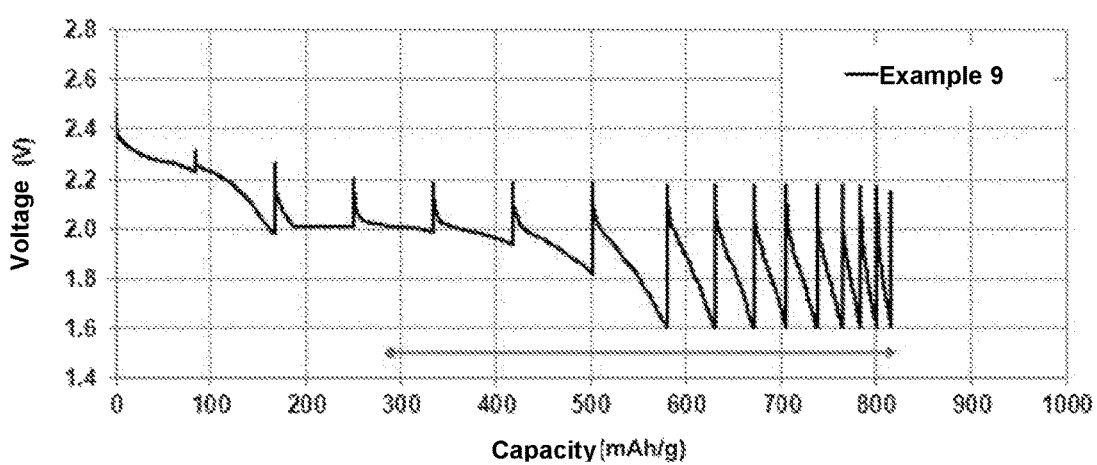
FIG. 6c illustrates the discharge of a battery of Example 9 versus a battery of Comparative Example 2.

A pulsed current, instead of a continuous current, is applied at the stage of formation. The pulsed current is characterized in that: the 0.1C current is applied for 6 hours followed by a 6 hours pause. Application of this pulsed current followed by the pause is repeated until the cutoff voltages are reached. The other conditions are the same as in Example 7. The battery discharge capacity in Example 9 is illustrated in FIG. 6c in comparison with Example 7 (Comparative Example 2). In Example 9, a capacity of 816 mAh is reached. This is 183% higher than the capacity obtained in Comparative Example 2.

Table 1 below outlines the various experimental conditions in Examples 1-9.

In an embodiment of the invention, the electrolyte in the cell is in liquid form as described in the Examples above. The electrolyte may also be an ionic liquid as described in Examples 7-9. As will be understood by a skilled person, other types of electrolyte may also be used.

In an embodiment of the invention, there is no limit on the amplitude of the current.

The scope of the claims should not be limited by the preferred embodiments set forth in the examples, but should be given the broadest interpretation consistent with the description as a whole.

The invention claimed is:

1. A process for charging and/or discharging of a Li—S battery or cell, comprising controlling the morphology of an active material of the Li—S battery or cell by applying a pulsed current at the charge stage, at the discharge stage, or at both the charge stage and the discharge stage, wherein the pulse current is obtained by applying a current for a limited period of time, followed by an inversion of the current for a limited period of time or a limited pause period.

2. The process according to claim 1, wherein the pulsed current is used at the charge step only.

3. The process according to claim 1, wherein the pulsed current is used at the discharge step only.

4. The process according to claim 1, comprising applying, in combination, the pulsed current and a constant current.

5. The process according to claim 4, wherein the pulsed current and the constant current are used at the charge step only.

6. The process according to claim 4, wherein the pulsed current and the constant current are used at the discharge step only.

7. The process according to claim 1, wherein the pulsed current is obtained by applying a constant current during a first period of time lasting between about 0.1 second to about 10 hours followed by an inversion of the current direction during a second period of time lasting between about 0.1 to about 10 hours.

8. The process according to claim 1, wherein the pulsed current is obtained by applying a constant current during a first period of time lasting between about 0.1 second to about

|  | Electrolyte | Discharge | Charge | Capacity |
|---|---|---|---|---|
| Example 1 (Comparative Example 1) | liquid | constant current | constant current | 909 mAh |
| Example 2 | liquid | pulsed current (−0.1 C. * 60 sec, +0.1 C. * 20 sec) | pulsed current (+0.1 C. * 60 sec, −0.1 C. * 20 sec) | 1034 mAh |
| Example 3 | liquid | pulsed current (−0.1 C. * 60 sec, +0.5 C. * 4 sec) | pulsed current (+0.1 C. * 60 sec, −0.5 C. * 4 sec) | 1036 mAh |
| Example 4 | liquid | pulsed current (−0.1 C. * 60 sec, +0.1 C. * 20 sec) | constant current | 1048 mAh |
| Example 5 | liquid | constant current | pulsed current (+0.1 C. * 60 sec, −0.1 C. * 20 sec) | 1008 mAh |
| Example 6 | liquid | hybrid current | constant current | 951 mAh |
| Example 7 (Comparative Example 2) | ionic liquid | constant current | constant current | 288 mAh |
| Example 8 | ionic liquid | pause 2 hours | pause 2 hours | 458 mAh |
| Example 9 | ionic liquid | pause 6 hours | pause 6 hours | 816 mAh |

10 hours followed by a pause during a second period of time lasting between about 0.1 to about 10 hours.

9. The device according to claim 1, wherein the pulsed current is obtained by applying a constant current during a first period of time lasting between about 0.1 second to about 10 hours followed by an inversion of the current direction during a second period of time lasting between about 0.1 to about 10 hours.

10. The device according to claim 1, wherein the pulsed current is obtained by applying a constant current during a first period of time lasting between about 0.1 second to about 10 hours followed by a pause during a period of time lasting between about 0.1 to about 10 hours.

11. A device for charging and/or discharging of a Li—S battery or cell, the device being configured for controlling the morphology of an active material of the Li—S battery or cell by providing:
   a pulsed current; or
   a combination of a pulsed current and a constant current,
   wherein the pulse current is obtained by applying a current for a limited period of time, followed by an inversion of the current for a limited period of time or a limited pause period.

12. A process for the manufacture of a Li—S battery or cell, comprising controlling the morphology of an active material of the Li—S battery or cell by a step of formation and/or aging of the battery, wherein the step uses a pulsed current,
   wherein the pulse current is obtained by applying a current for a limited period of time, followed by an inversion of the current for a limited period of time or a limited pause period.

13. The process according to claim 12, wherein the pulsed current is obtained by applying a constant current during a first period of time followed by an inversion of the current direction during a second period of time.

14. The process according to claim 12, wherein the pulsed current is obtained by applying a constant current during a first period of time followed by a pause during a period of time.

15. The process according to claim 12, wherein the pulsed current is obtained by applying a constant current during a first period of time lasting between about 0.1 second to about 10 hours followed by an inversion of the current direction during a second period of time lasting between about 0.1 to about 10 hours.

16. The process according to claim 12, wherein the pulsed current is obtained by applying a constant current during a first period of time lasting between about 0.1 second to about 10 hours followed by a pause during a period of time lasting between about 0.1 to about 10 hours.

17. A process for the manufacture of a Li—S battery or cell, comprising controlling the morphology of an active material of the Li—S battery or cell by a step of formation and/or aging of the battery, wherein the step uses a combination of a pulsed current and a constant current,
   wherein the pulse current is obtained by applying a current for a limited period of time, followed by an inversion of the current for a limited period of time or a limited pause period.

* * * * *